United States Patent
Yao et al.

(10) Patent No.: US 10,838,985 B2
(45) Date of Patent: Nov. 17, 2020

(54) ITEM RECOMMENDATION METHOD, DEVICE, AND SYSTEM

(71) Applicant: GUANGZHOU UCWEB COMPUTER TECHNOLOGY CO., LTD., Guangzhou (CN)

(72) Inventors: Wenqing Yao, Guangzhou (CN); Rongshen Long, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 171 days.

(21) Appl. No.: 15/389,136

(22) Filed: Dec. 22, 2016

(65) Prior Publication Data
US 2017/0220589 A1 Aug. 3, 2017

(30) Foreign Application Priority Data
Feb. 3, 2016 (CN) .......................... 2016 1 0075016

(51) Int. Cl.
*G06F 16/28* (2019.01)
*G06F 16/22* (2019.01)

(52) U.S. Cl.
CPC ........ *G06F 16/285* (2019.01); *G06F 16/2228* (2019.01)

(58) Field of Classification Search
CPC ......... G06F 17/30598; G06F 17/30321; G06F 16/285; G06F 16/2228
See application file for complete search history.

(56) References Cited

U.S. PATENT DOCUMENTS 6,748,395 B1 * 6/2004 Picker ................ G06Q 30/0209
7,072,846 B1 * 7/2006 Robinson ........... G06Q 30/0202
                                                                705/7.32
(Continued)

FOREIGN PATENT DOCUMENTS

CN        101206752        6/2008
CN        102722838       10/2012
(Continued)

OTHER PUBLICATIONS

First Notice issued by China State Intellectual Property Office, dated Oct. 27, 2016 for Chinese Patent Application No. 201610075016.8 with search report.
(Continued)

*Primary Examiner* — Miranda Le
(74) *Attorney, Agent, or Firm* — Sheppard Mullin Richter & Hampton LLP

(57) ABSTRACT

An item recommendation system includes a candidate item database system, a communication module, and a processor. Candidate items to be recommended to a user are stored in the candidate item database system in association with the access items accessed by the user. The communication module acquires one or more access items accessed by the user recently. The processor acquires one or more candidate items and correlation indexes thereof from the candidate item database system based on the one or more access items, and generates an item recommendation list, wherein the item recommendation list comprises the one or more candidate items and recommendation weights thereof, and the recommendation weights are determined based on the correlation indexes.

10 Claims, 4 Drawing Sheets

(56) References Cited

U.S. PATENT DOCUMENTS

| | | | |
|---|---|---|---|
| 7,526,458 B2* | 4/2009 | Flinn | G06N 5/048 |
| | | | 706/12 |
| 7,542,951 B1* | 6/2009 | Chakrabarti | G06N 20/00 |
| | | | 706/45 |
| 7,574,422 B2 | 8/2009 | Guan et al. | |
| 7,668,821 B1* | 2/2010 | Donsbach | G06F 17/30867 |
| | | | 707/765 |
| 7,720,723 B2 | 5/2010 | Dicker et al. | |
| 7,945,485 B2 | 5/2011 | Kane, Jr. et al. | |
| 7,949,659 B2 | 5/2011 | Chakrabarti et al. | |
| 7,970,660 B2 | 6/2011 | Bezos et al. | |
| 8,117,085 B1 | 2/2012 | Smith | |
| 8,156,059 B2* | 4/2012 | Dunning | G06N 20/00 |
| | | | 706/45 |
| 8,301,623 B2 | 10/2012 | Chakrabarti et al. | |
| 8,301,624 B2 | 10/2012 | Park et al. | |
| 8,319,087 B2* | 11/2012 | Gossweiler | G11B 27/105 |
| | | | 84/600 |
| 8,341,006 B2* | 12/2012 | Lin | G06Q 30/0202 |
| | | | 703/2 |
| 8,370,203 B2 | 2/2013 | Dicker et al. | |
| 8,489,515 B2* | 7/2013 | Mathur | G06Q 50/01 |
| | | | 705/319 |
| 8,620,767 B2 | 12/2013 | Linden et al. | |
| 8,700,448 B2* | 4/2014 | Bertram | G06Q 30/02 |
| | | | 705/14.1 |
| 8,751,507 B2 | 6/2014 | Kim et al. | |
| 8,781,916 B1* | 7/2014 | Buryak | G06Q 30/0631 |
| | | | 705/26.7 |
| 8,804,999 B2* | 8/2014 | Ho | G06F 17/30825 |
| | | | 382/100 |
| 9,075,882 B1* | 7/2015 | Ward | G06Q 30/0631 |
| 9,208,155 B2* | 12/2015 | Nice | G06Q 30/0255 |
| 9,361,624 B2* | 6/2016 | Spears | G06Q 30/02 |
| 9,436,756 B2* | 9/2016 | Devkar | G06F 16/285 |
| 9,542,649 B2* | 1/2017 | Su | G06N 5/04 |
| 9,582,592 B2* | 2/2017 | Mason | G06F 16/954 |
| 9,646,109 B2* | 5/2017 | Gross | G06Q 30/02 |
| 9,760,802 B2 | 9/2017 | Chen et al. | |
| 9,824,144 B2* | 11/2017 | Farrelly | H04L 67/306 |
| 10,055,778 B1 | 8/2018 | Dillon | |
| 2003/0149612 A1* | 8/2003 | Berghofer | G06Q 30/02 |
| | | | 705/7.29 |
| 2007/0208771 A1* | 9/2007 | Platt | G10H 1/0058 |
| 2009/0006368 A1* | 1/2009 | Mei | G06F 17/30796 |
| 2009/0006374 A1* | 1/2009 | Kim | G06F 16/335 |
| 2009/0055426 A1* | 2/2009 | Kalasapur | G06F 16/637 |
| 2010/0010877 A1 | 1/2010 | Hunt et al. | |
| 2010/0162115 A1* | 6/2010 | Ringewald | G11B 27/034 |
| | | | 715/716 |
| 2010/0241701 A1* | 9/2010 | Lester | H04N 21/26258 |
| | | | 709/203 |
| 2011/0153663 A1* | 6/2011 | Koren | H04N 21/4668 |
| | | | 707/776 |
| 2012/0023405 A1* | 1/2012 | Hyman | G06F 16/68 |
| | | | 715/716 |
| 2013/0159243 A1* | 6/2013 | Wei | H04N 21/26258 |
| | | | 706/54 |
| 2013/0239008 A1* | 9/2013 | Curtis | G06Q 10/00 |
| | | | 715/738 |
| 2014/0013353 A1* | 1/2014 | Mathur | G06F 17/30867 |
| | | | 725/34 |
| 2014/0344103 A1* | 11/2014 | Zhu | G06Q 30/0631 |
| | | | 705/26.7 |
| 2015/0012468 A1* | 1/2015 | Kegel | H04N 21/4668 |
| | | | 706/12 |
| 2015/0051973 A1* | 2/2015 | Li | G06Q 30/02 |
| | | | 705/14.53 |
| 2015/0154278 A1* | 6/2015 | Allen | G06F 16/2457 |
| | | | 707/737 |
| 2015/0178283 A1* | 6/2015 | Garg | H04L 67/10 |
| | | | 707/748 |
| 2015/0235136 A1* | 8/2015 | Dillon | G06N 5/04 |
| | | | 706/46 |
| 2015/0286650 A1* | 10/2015 | Stump | G06Q 50/01 |
| | | | 705/319 |
| 2015/0286662 A1* | 10/2015 | Marra | G06F 17/30321 |
| | | | 707/741 |
| 2016/0294961 A1* | 10/2016 | Cordes | H04L 67/22 |
| 2018/0089513 A1* | 3/2018 | Cremonesi | G06K 9/00718 |
| 2018/0165554 A1* | 6/2018 | Zhang | G06N 3/04 |

FOREIGN PATENT DOCUMENTS

| | | |
|---|---|---|
| CN | 103186595 | 7/2013 |
| CN | 103246980 | 8/2013 |
| CN | 103488789 | 1/2014 |
| CN | 103500212 A | 1/2014 |
| CN | 103729775 | 4/2014 |

OTHER PUBLICATIONS

Supplementary search report issued by China State Intellectual Property Office, dated Mar. 1, 2017 for Chinese Patent Application No. 201610075016.8.

Second Office Action dated Mar. 14, 2017, issued in related Chinese Application No. 201610075016.8 (4 pages).

Supplementary Search dated Jun. 15, 2017, issued in related Chinese Application No. 201610075016.8 (1 page).

Third Office Action dated Jun. 27, 2017, issued in related Chinese Application No. 201610075016.8 (14 pages), with English machine translation.

* cited by examiner

ITEM RECOMMENDATION METHOD, DEVICE, AND SYSTEM

CROSS REFERENCE TO RELATED APPLICATION

This application is based upon and claims priority to Chinese Patent Application No. 201610075016.8, filed Feb. 3, 2016, the entire contents of which are incorporated herein by reference.

TECHNICAL FIELD

The present invention relates to the field of mobile Internet technology, and specifically relates to an item recommendation system, an item recommendation device and an item recommendation method.

BACKGROUND

With rapid development of Internet technology, information contents on networks increase explosively. However, rich network information contents also increase users' costs for retrieving contents of interest while bringing great convenience to the users.

The above problem is generally solved by a recommendation technology in the prior art. For example, the contents of interest are mainly recommended to users by digging user behavior data, so that the path for retrieving information by users is shortened and the efficiency of acquiring contents by users is improved.

However, most of the existing recommendation systems carry out recommendations based on offline digging results, and cannot meet the recommendation requirements of real-time interests of users. Thus, it is desired by users to provide a method capable of quickly responding to the requirements of users and adjusting the recommendation results in real time according to user access behaviors.

SUMMARY

To solve the above technical problems, the present invention provides an item recommendation system, an item recommendation device and an item recommendation method, which can generate a recommendation result in real time according to recent access behaviors of a user.

According to one aspect of the present disclosure, an item recommendation system is provided. The item recommendation system includes a candidate item database system for storing candidate items to be recommended to a user accessing access items in association with the access items; a communication module for acquiring one or more access items accessed by the user recently; and a processor for acquiring one or more candidate items and correlation indexes thereof from the candidate item database system based on the one or more access items, and generating an item recommendation list, wherein the item recommendation list includes the one or more candidate items and recommendation weights thereof, and the recommendation weights are determined based on the correlation indexes. By the embodiments of the present disclosure, a targeted recommendation result can be generated in real time according to the access behavior of a user.

According to some embodiments, the item recommendation system may further include: a memory for storing a historical recommendation list of the user, wherein the historical recommendation list includes historical recommendation items recommended to the user historically and historical recommendation weights thereof, the processor further reads the historical recommendation items recommended to the user historically and the historical recommendation weights thereof from the memory, generates the item recommendation list by fusing the historical recommendation items and the one or more candidate items, and updates the historical recommendation list according to the item recommendation list. Thus, reference may be further made to the contents recommended in the past while items are recommended to the user based on the real-time access behavior of the user.

According to another aspect of the present disclosure, an item recommendation device is provided. The item recommendation device includes an acquisition module for acquiring one or more candidate items and correlation indexes thereof from a candidate item database based on one or more access items accessed by a user recently, wherein the candidate item database stores candidate items to be recommended to the user accessing the access items in association with the access items; and a recommendation module for generating an item recommendation list according to the candidate items and the correlation indexes thereof acquired by the acquisition module, wherein the item recommendation list includes the one or more candidate items and recommendation weights thereof, and the recommendation weights are determined based on the correlation indexes. By the item recommendation device, a targeted recommendation result can be generated in real time according to the access behavior of a user.

According to some embodiments, the acquisition module acquires one or more candidate items and correlation indexes thereof from the candidate item database including an item association database and/or a cluster association database; the item association database stores candidate items associated with access items respectively, and the correlation indexes are association coefficients of the candidate items relative to the access items; the cluster association database stores clusters of the access items and candidate items included in the clusters, and the correlation indexes are membership degrees of the access items and the candidate items relative to the clusters.

According to some other embodiments, the recommendation module may include a first recommendation module and a second recommendation module. The first recommendation module is used for, in the case where the candidate item database includes an item association database, determining first recommendation weights for the candidate items acquired from the item association database according to the following formula, and determining the recommendation weights of the candidate items based on the first recommendation weights of the candidate items:

$$r_{uj} = \sum_{i \in R(u)} k_{ui} sim(i, j) \tag{1}$$

wherein, $r_{uj}$ is a first recommendation weight of a candidate item $I_j$ relative to a user u, R(u) is a set of access items $I_i$ accessed by the user recently, $k_{ui}$ is a coefficient, and sim(i, j) is an association coefficient of the candidate item $I_j$ relative to the access item $I_i$.

The second recommendation module is used for, in the case where the candidate item database includes a cluster association database, determining second recommendation weights for the candidate items acquired from the cluster association database according to the following formula, and determining the recommendation weights of the candidate items based on the second recommendation weights of the candidate items:

$$r'_{uj} = \sum_{i \in R(u)} \sum_{c \in C(i)} k'_{ui} sim'(c, i) sim'(c, j) \qquad (2)$$

wherein, $r'_{uj}$ is a second recommendation weight of a candidate item $I_j$ relative to the user u, R(u) is a set of access items $I_i$ accessed by the user recently, C(i) is a set of clusters of the items $I_i$, $k'_{ui}$ is a coefficient, sim'(c,i) is a membership degree of the access item $I_i$ relative to a cluster c, and sim'(c, j) is a membership degree of the candidate item $I_j$ relative to the cluster c; a third recommendation module is used for, in the case where the candidate item database includes the item association database and the cluster association database, determining the recommendation weights of the candidate items based on a combination of the first recommendation weights of the first recommendation module and the second recommendation weights of the second recommendation module for the same candidate items.

The recommendation module may further include: a fourth recommendation module, for, in the case where the acquisition module acquires historical recommendation items recommended to the user historically and historical recommendation weights thereof from a historical recommendation list of the user, fusing the historical recommendation items and the one or more candidate items, and determining the recommendation weights based on the correlation indexes and the historical recommendation weights of the same candidate items among the historical recommendation items and the one or more candidate items.

In some embodiments, the device may further include: an update module, for updating the historical recommendation list of the user using the item recommendation list generated by the fourth recommendation module. According to another aspect of the present disclosure, an item recommendation method is provided. The item recommendation method includes acquiring one or more candidate items and correlation indexes thereof from a candidate item database based on one or more access items accessed by a user recently, wherein the candidate item database stores candidate items to be recommended to the user accessing the access items in association with the access items; and generating an item recommendation list, wherein the item recommendation list includes the one or more candidate items and recommendation weights thereof, and the recommendation weights are determined based on the correlation indexes. Thus, a targeted recommendation result can be generated in real time according to the access behavior of a user.

In some embodiments, the candidate item database includes an item association database and/or a cluster association database, the item association database stores candidate items associated with access items respectively, and the correlation indexes are association coefficients of the candidate items relative to the access items; the cluster association database stores clusters of the access items and candidate items included in the clusters, and the correlation indexes are membership degrees of the access items and the candidate items relative to the clusters. Thus, the correction between items can be acquired according to direct correlation information between the items in the item association database and/or cluster information of the items in the cluster association database.

In some embodiments, in the case where the candidate item database includes an item association database, first recommendation weights may be determined for the candidate items acquired from the item association database according to the following formula, and the recommendation weights of the candidate items are determined based on the first recommendation weights of the candidate items:

$$r_{uj} = \sum_{i \in R(u)} k_{ui} sim(i, j) \qquad (1)$$

wherein, $r_{uj}$ is a first recommendation weight of a candidate item $I_j$ relative to a user u, R(u) is a set of access items $I_i$ accessed by the user recently, $k_{ui}$ is a coefficient, and sim(i, j) is an association coefficient of the candidate item $I_j$ relative to the access item $I_i$.

In the case where the candidate item database includes a cluster association database, second recommendation weights may be determined for the candidate items acquired from the cluster association database according to the following formula, and the recommendation weights of the candidate items are determined based on the second recommendation weights of the candidate items:

$$r'_{uj} = \sum_{i \in R(u)} \sum_{c \in C(i)} k'_{ui} sim'(c, i) sim'(c, j) \qquad (2)$$

wherein, $r'_{uj}$ is a second recommendation weight of a candidate item $I_j$ relative to the user u, R(u) is a set of access items $I_i$ accessed by the user recently, C(i) is a set of clusters of the items $I_i$, $k'_{ui}$ is a coefficient, sim'(c,i) is a membership degree of the access item $I_i$ relative to a cluster c, and sim'(c, j) is a membership degree of the candidate item $I_j$ relative to the cluster c; in the case where the candidate item database includes the item association database and the cluster association database, the recommendation weights of the candidate items are determined based on a combination of the first recommendation weights and the second recommendation weights of the same candidate items.

In some embodiments, the item recommendation method may further include: acquiring historical recommendation items recommended to the user historically and historical recommendation weights thereof from a historical recommendation list of the user, wherein the step of generating an item recommendation list includes: fusing the historical recommendation items and the one or more candidate items, and determining the recommendation weights based on the correlation indexes and the historical recommendation weights of the same candidate items among the historical recommendation items and the one or more candidate items. Thus, reference may be further made to the contents recommended in the past while items are recommended to the user based on the real-time access behavior of the user.

According to some embodiments, the item recommendation method may further include: updating the historical recommendation list of the user using the item recommendation list. Thus, the current recommendation result can be stored as a reference for later recommendation.

According to some other embodiments, the item recommendation method may further include: acquiring correlation items among many users according to item access logs of the users, thus forming the candidate item database. Thus, candidate items worthy of recommendation can be preliminarily forecasted based on the item access behaviors of many users.

Through the solution of the embodiments of the present disclosure, one or more candidate items and correlation indexes thereof are acquired from a candidate item database based on one or more access items accessed by a user recently, and then an item recommendation list is generated as a recommendation result on this basis, so that a recommendation result can be generated in real time according to the recent access behavior of the user, and the recommendation requirement of real-time interest of the user can be met by digging the result online.

Further, the candidate item database in the embodiments of the present disclosure may include an item association database and/or a cluster association database, and different recommendation results may be realized according to the included different contents. For example, in the case where the candidate item database includes an item association database, first recommendation weights may be determined for the candidate items acquired from the item association database according to a set formula; in the case where the candidate item database includes a cluster association database, second recommendation weights may be determined for the candidate items acquired from the cluster association database according to a set formula; in the case where the candidate item database includes an item association database and a cluster association database, the recommendation weights of the candidate items may be determined based on a combination of the first recommendation weights and the second recommendation weights of the same candidate items.

Further, in the embodiments of the present disclosure, historical recommendation items recommended to the user historically and historical recommendation weights thereof may also be acquired from a historical recommendation list of the user, and the historical recommendation items and the one or more candidate items are fused for recommendation.

BRIEF DESCRIPTION OF THE DRAWINGS

The exemplary implementations of the present disclosure will be described in more detail in combination with the accompanying drawings, so that the above-mentioned and other purposes, features and advantages of the present disclosure will become more obvious, wherein the same reference signs generally indicate the same components in the exemplary implementations of the present disclosure.

DETAILED DESCRIPTION OF THE EMBODIMENTS

Figure 1:
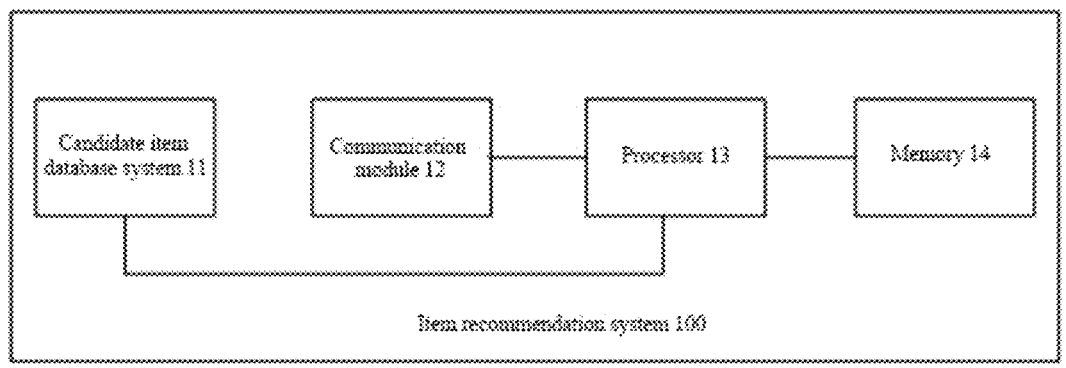
FIG. 1 is a schematic block diagram of an item recommendation system according to one embodiment of the present disclosure.

Preferred implementations of the present disclosure will be described in more detail below with reference to the accompanying drawings. Although the preferred implementations of the present disclosure are shown in the drawings, it should be understood that the present disclosure may be realized in various forms and should not be limited to the implementations illustrated herein. Conversely, these implementations are provided to make the present disclosure more thorough and complete, and completely transmit the scope of the present disclosure to those skilled in the art.

The present disclosure provides an item recommendation system, which can generate a recommendation result in real time according to the recent access behaviors of a user.

FIG. 1 is a schematic block diagram of an item recommendation system according to one embodiment of the present disclosure.

As shown in FIG. 1, the item recommendation system 100 in the embodiment of the present disclosure includes a candidate item database system 11, a communication module 12, a processor 13, and a memory 14.

Candidate items ready to be recommended to a user accessing access items are stored in the candidate item database system 11 in association with the access items.

The communication module 12 is used for acquiring one or more access items accessed by the user recently.

The processor 13 acquires one or more candidate items and correlation indexes thereof from the candidate item database system 11 based on the one or more access items, and generates an item recommendation list. The item recommendation list includes the one or more candidate items and recommendation weights thereof. The recommendation weights are determined based on the correlation indexes.

The memory 14 stores a historical recommendation list of the user. The historical recommendation list includes historical recommendation items recommended to the user and historical recommendation weights thereof.

The processor 13 reads the historical recommendation items recommended to the user historically and the historical recommendation weights thereof from the memory 14. The item recommendation list is generated by fusing the historical recommendation items and the one or more candidate items. The processor 13 further updates the historical recommendation list according to the item recommendation list.

Figure 2:
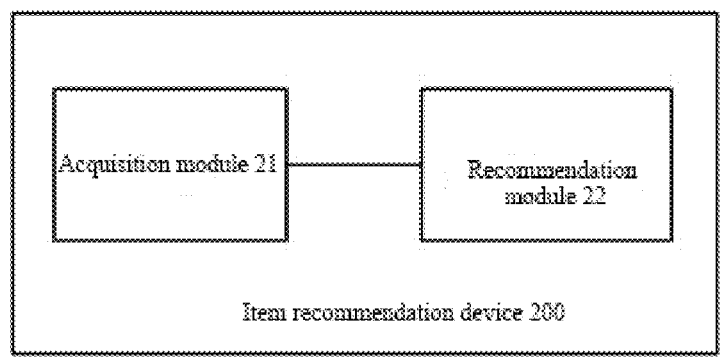
FIG. 2 is a first schematic block diagram of an item recommendation device according to one embodiment of the present disclosure.

The processor 13 in the item recommendation system 100 may further include multiple submodules, and specifically, reference may be made to a structural schematic diagram of an item recommendation device in FIG. 2. FIG. 2 is a first schematic block diagram of an item recommendation device according to one embodiment of the present disclosure. The item recommendation device 200 in FIG. 2 may be equivalent to the processor 13 in the item recommendation system 100 of FIG. 1.

Figure 3:
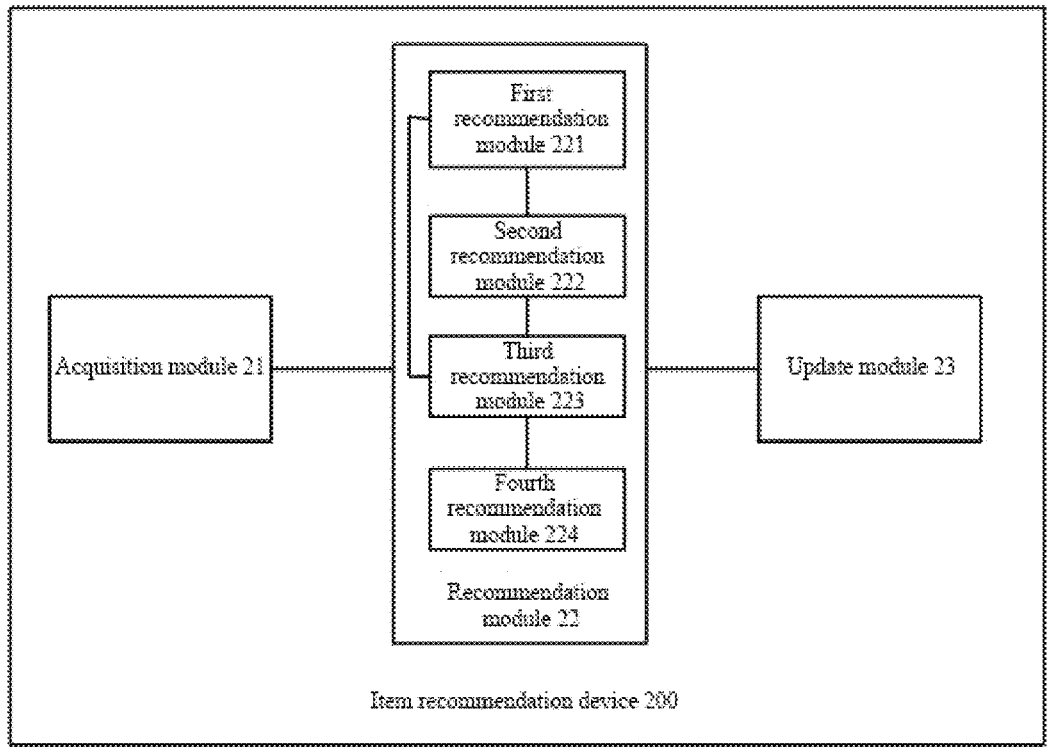
FIG. 3 is a second schematic block diagram of an item recommendation device according to one embodiment of the present disclosure.

The item recommendation device 200 of FIG. 2 includes an acquisition module 21 and a recommendation module 22. FIG. 3 shows a second schematic block diagram of the item recommendation device. The recommendation module 22 in the item recommendation device 200 may include: a first recommendation module 221, a second recommendation module 222, a third recommendation module 223 and a fourth recommendation module 224. In addition, the item recommendation device 200 may further include an update module 23.

The first recommendation module 221, in the case where the candidate item database includes an item association database, determines first recommendation weights for the candidate items acquired from the item association database according to the following formula, and determines the recommendation weights of the candidate items based on the first recommendation weights of the candidate items:

$$r_{uj} = \sum_{i \in R(u)} k_{ui} sim(i, j) \quad (1)$$

wherein, $r_{uj}$ is a first recommendation weight of a candidate item $I_j$ relative to a user u, R(u) is a set of access items $I_i$ accessed by the user recently, $k_{ui}$ is a coefficient, and sim(i, j) is an association coefficient of the candidate item $I_j$ relative to the access item $I_i$.

The second recommendation module 222, in the case where the candidate item database includes a cluster association database, determines second recommendation weights for the candidate items acquired from the cluster association database according to the following formula, and determines the recommendation weights of the candidate items based on the second recommendation weights of the candidate items:

$$r'_{uj} = \sum_{i \in R(u)} \sum_{c \in C(i)} k'_{ui} sim'(c, i) sim'(c, j) \quad (2)$$

wherein, $r'_{uj}$ is a second recommendation weight of a candidate item $I_j$ relative to the user u, R(u) is a set of access items $I_i$ accessed by the user recently, C(i) is a set of clusters of the items $I_i$, $k'_{ui}$ is a coefficient, sim'(c,i) is a membership degree of the access item $I_i$ relative to a cluster c, and sim'(c, j) is a membership degree of the candidate item $I_j$ relative to the cluster c.

The third recommendation module 223, in the case where the candidate item database includes the item association database and the cluster association database, determines the recommendation weights of the candidate items based on a combination of the first recommendation weights of the first recommendation module and the second recommendation weights of the second recommendation module for the same candidate items.

The fourth recommendation module 224, in the case where the acquisition module acquires historical recommendation items recommended to the user historically and historical recommendation weights thereof from a historical recommendation list of the user, fuses the historical recommendation items and the one or more candidate items, and determines the recommendation weights based on the correlation indexes and the historical recommendation weights of the same candidate items among the historical recommendation items and the one or more candidate items.

In addition, the historical recommendation list of the user may also be updated via the update module 23 using the item recommendation list generated by the fourth recommendation module 224.

The structures of the item recommendation system and the item recommendation device according to some embodiments of the present disclosure are described above. An item recommendation method according to some embodiments of the present disclosure is described in detail below in combination with the above structures.

Figure 4:
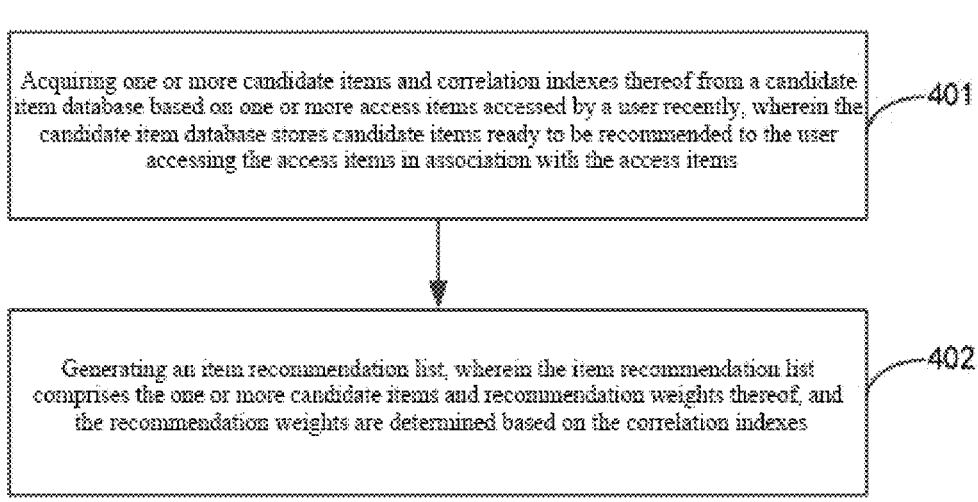
FIG. 4 is a first schematic flow diagram of an item recommendation method according to one embodiment of the present disclosure.

FIG. 4 shows a first schematic flow diagram of an item recommendation method according to one embodiment of the present disclosure.

As shown in FIG. 4, in step 401, for example, the processor 13 or the item recommendation device 200 (e.g., the acquisition module 21 in the item recommendation device 200) may acquire one or more candidate items and correlation indexes thereof from a candidate item database based on one or more access items accessed by a user recently. The candidate item database stores candidate items ready to be recommended to the user accessing the access items in association with the access items.

The candidate item database includes an item association database and/or a cluster association database. The item association database stores candidate items associated with access items respectively. The cluster association database stores clusters of the access items and candidate items included in the clusters.

In the embodiment of the present disclosure, correlation items among many users are acquired according to item access logs of the users, and then the candidate item database is formed.

In step 402, for example, the processor 13 or the item recommendation device 200 (e.g., the recommendation module 22 in the item recommendation device 200) may generate an item recommendation list. The item recommendation list includes the one or more candidate items and recommendation weights thereof, and the recommendation weights are determined based on the correlation indexes.

When the candidate item database is an item association database, the correlation indexes are association coefficients of the candidate items relative to the access items; and when the candidate item database is a cluster association database, the correlation indexes are membership degrees of the access items and the candidate items relative to the clusters.

The generated item recommendation list may be ranked based on the recommendation weights and presents recommendation items to the user, and the ranking based on the recommendation weights may be but not limited to high-to-low ranking.

In the case where the candidate item database includes an item association database, the recommendation module in the item recommendation device determines first recommendation weights for the candidate items acquired from the item association database according to the following formula, and determines the recommendation weights of the candidate items based on the first recommendation weights of the candidate items:

$$r_{uj} = \sum_{i \in R(u)} k_{ui} sim(i, j) \quad (1)$$

where, $r_{uj}$ is a first recommendation weight of a candidate item $I_j$ relative to a user u, R(u) is a set of access items $I_i$ accessed by the user recently, $k_{ui}$ is a coefficient, and sim(i, j) is an association coefficient of the candidate item $I_j$ relative to the access item $I_i$.

In the case where the candidate item database includes a cluster association database, the recommendation module in the item recommendation device determines second recommendation weights for the candidate items acquired from the cluster association database according to the following formula, and determines the recommendation weights of the candidate items based on the second recommendation weights of the candidate items:

$$r'_{uj} = \sum_{i \in R(u)} \sum_{c \in C(i)} k'_{ui} sim'(c, i) sim'(c, j) \qquad (2)$$

where, $r'_{uj}$ is a second recommendation weight of a candidate item $I_j$ relative to the user u, R(u) is a set of access items $I_i$ accessed by the user recently, C(i) is a set of clusters of the items $I_i$, $k'_{ui}$ is a coefficient, sim'(c,i) is a membership degree of the access item $I_i$ relative to a cluster c, and sim'(c, j) is a membership degree of the candidate item $I_j$ relative to the cluster c.

In the case where the candidate item database includes the item association database and the cluster association database, the recommendation module in the item recommendation device determines the recommendation weights of the candidate items based on a combination of the first recommendation weights and the second recommendation weights of the same candidate items.

One or more candidate items and correlation indexes thereof are acquired from a candidate item database based on one or more access items accessed by a user recently, and then an item recommendation list is generated as a recommendation result on this basis, so that a recommendation result can be generated in real time according to the recent access behavior of the user, and the recommendation requirement of real-time interest of the user can be met by digging the result online.

Figure 5:
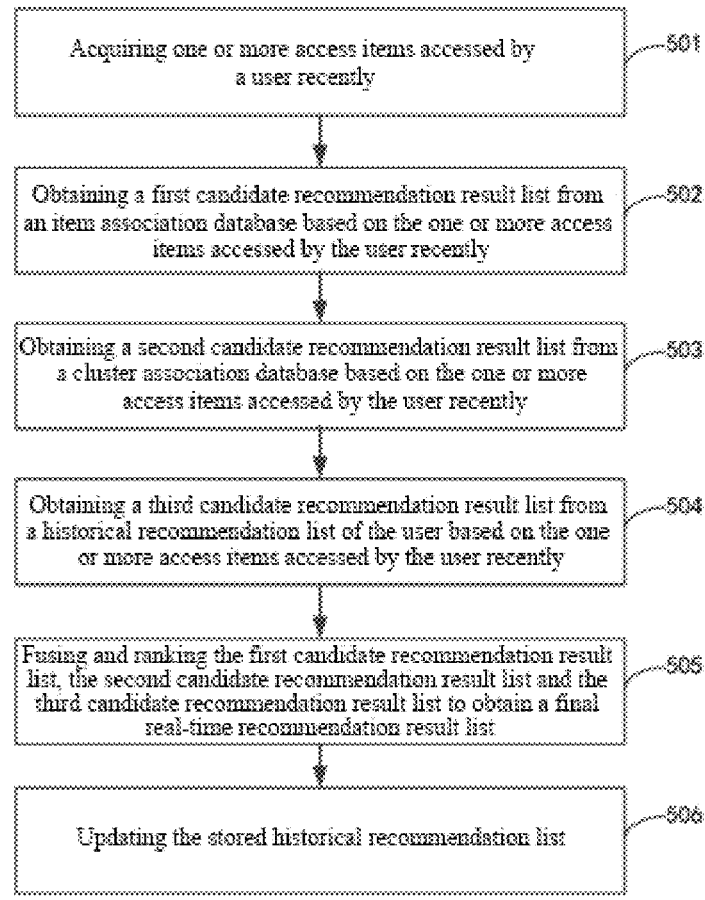
FIG. 5 is a second schematic flow diagram of an item recommendation method according to one embodiment of the present disclosure.

FIG. 5 is a second schematic flow diagram of an item recommendation method according to one embodiment of the present disclosure. FIG. 5 shows the technical solution of the embodiment of the present disclosure in more detail relative to FIG. 4.

The item recommendation method in the embodiment of the present disclosure is a real-time personalized recommendation method based on items recently accessed by a user. In the method, one or more candidate items and correlation indexes thereof are acquired from a candidate item database based on one or more access items recently accessed by a user, and then an item recommendation list is generated as a recommendation result on this basis, so that the effect of adjusting the recommendation result in real time according to the access of the user is achieved, the requirement of the user for real-time recommendation is met and the user experience is improved. The candidate item database includes an item association database and/or a cluster association database. The item association database, for example, may include an item-item list, but is not limited thereto. The item-item list may be previously established based on an item-item relation obtained offline. The cluster association database, for example, may include a cluster-item forward index and an item-cluster reverse index but is not limited thereto. The cluster-item forward index and the item-cluster reverse index may be previously established based on an item-cluster relation and a cluster-item relation obtained offline.

In the embodiment of the present disclosure, the real-time interest of a user can be modeled using items recently accessed by the user and clusters thereof, and relevant items are found via the item-item relation, the item-cluster relation and the cluster-item relation obtained offline previously as a real-time recommendation result. Clustering refers to a process of classifying data to different classes or clusters, or a clustering result obtained via the process. Thus, the objects in the same cluster have great similarity, whereas the objects among different clusters have great difference.

Online recommendation may be realized using the offline digging result in the embodiment of the present disclosure.

Offline digging mainly refers to previously digging an item-item correlation, an item-cluster relation and a cluster-item relation and entering the same into a candidate item database for online storage. The offline digging process includes: firstly, digging an item-item correlation offline using the existing relevant technology, generating a relevant item list for each item, thus obtaining an item-item list; secondly, clustering the items to obtain a cluster of each item, and establishing a cluster-item forward index and an item-cluster reverse index; and finally, guiding the item-item list, the cluster-item forward index and the item-cluster reverse index into the candidate item database for online storage, so as to retrieve and inquire recommendation results online and generate a real-time recommendation result.

Online recommendation mainly refers to retrieving recommendation results and generating a real-time recommendation result. Firstly, the real-time interest of a user is modeled using the current accessed item, and the item-item recommendation result obtained offline previously is retrieved to obtain a first candidate recommendation item list; secondly, short-term item preference of the user is modeled using the current accessed item cluster, and the cluster-item list obtained offline previously is retrieved to obtain a second candidate recommendation item list; and finally, the first candidate recommendation item list and the second candidate recommendation item list are fused and ranked to obtain a final real-time recommendation result list.

When the candidate item database for online storage only includes the item-item list or only includes the cluster-item forward index and the item-cluster reverse index, the first candidate recommendation item list or the second candidate recommendation item list can be directly obtained.

The stored historical recommendation list, e.g., the latest real-time personalized recommendation result list, can be further retrieved using a user identification (ID), to obtain a third candidate recommendation item list; and finally, the first candidate recommendation item list, the second candidate recommendation item list and the third candidate recommendation item list are fused and ranked to obtain a final real-time recommendation result list, and the stored historical recommendation list is updated.

The technical solution in the embodiment of the present disclosure will be described in detail below in combination with FIG. 5.

As shown in FIG. 5, in step 501, for example, the processor 13 or the item recommendation device 200 (e.g., the acquisition module 21 in the item recommendation device 200) may acquire one or more access items accessed by a user recently.

In step 502, for example, the processor 13 or the item recommendation device 200 (e.g., the recommendation module 22 in the item recommendation device 200) may obtain a first candidate recommendation item list from an item association database based on the one or more access items recently accessed by the user.

The step of obtaining the first candidate recommendation item list from the item association database refers to acquiring one or more candidate items and correlation indexes thereof from a candidate item database. The candidate item database in the embodiment of the present disclosure may include the item association database and/or a cluster association database. That is to say, items can be associated directly or associated indirectly via clusters. In this step, the first candidate recommendation item list is obtained from the item association database.

Candidate items ready to be recommended to a user accessing access items are stored in the candidate item database of the embodiment of the present disclosure in association with the access items.

For example, candidate items associated with access items respectively are stored in the item association database, and the correlation indexes of the candidate items acquired from the candidate item database at the moment are association coefficients of the candidate items relative to the access items.

Each access item may be an access item recently accessed by the current user, or an item previously accessed, or an access item which needs to be given a corresponding candidate item due to the possibility of being accessed by any user. Each access item and each candidate item set may be the same or different.

The item association database and the cluster association database in the candidate item database are obtained previously via offline digging, and the offline digging process may include:

1) An item-item correlation is obtained, and an item-item list (also referred to as an item recommendation result list) is generated. Regarding the digging method of the item-item correlation, an algorithm of association rules, mutual information, Chi-square test quantity, cosine similarity or the like in the prior art may be used for measuring, and is not repeated herein.

2) Items are clustered, and a cluster-item forward index and an item-cluster reserve index are established. The items are clustered in an optional mode of establishing a preference matrix according to the item access behavior of a user and clustering the items by adopting a k-means algorithm. The k-means algorithm is a typical distance-based clustering algorithm, and uses distance as an evaluation indicator of similarity, that is, the shorter the distance between two objects is, the higher the similarity of them is. Moreover, items may also be characterized on the semantic level and then clustered. After the clustering result is generated, an item-cluster reverse index and a cluster-item forward index are constructed, the former may be used for acquiring a cluster of the current accessed item during real-time recommendation, and the latter may be used for inquiring candidate items in the cluster and then generating candidate recommendation items.

3) The item-item list, the item-cluster reverse index and the cluster-item forward index are guided into the candidate item database for online storage. For example, the item-item list, the item-cluster reverse index and the cluster-item forward index generated by offline digging may be guided into a redis, and corresponding recommendation result lists may be obtained by retrieving the redis during real-time recommendation. The redis is a high-performance key-value database.

In step 502, candidate items associated with access items respectively are stored in the item association database, in the case where the candidate item database includes the item association database, first recommendation weights are determined for the candidate items acquired from the item association database according to formula (1) below, and the recommendation weights of the candidate items are determined based on the first recommendation weights of the candidate items:

$$r_{uj} = \sum_{i \in R(u)} k_{ui} sim(i, j) \quad (1)$$

wherein, $r_{uj}$ is a first recommendation weight of a candidate item $I_j$ relative to a user u, R(u) is a set of access items $I_i$ recently accessed by the user, $k_{ui}$ is a coefficient representing a weight, and sim(i, j) is an association coefficient of the candidate item $I_j$ relative to the access item $I_i$. The coefficient $k_{ui}$ is generally 1, or different coefficients are allocated to different $I_i$. For example, the later the time when the user u accesses the $I_i$ is, the larger the coefficient $k_{ui}$ may be. If R(u) is a set of all access items (no matter whether the user accesses the access items) herein, the coefficient $k_{ui}$ is 0 for the access items not accessed by the user recently.

That is to say, a first candidate recommendation item list is generated by retrieving the item-item list (also referred to as an item recommendation result list) in this step. The schematic algorithm in this step is shown in FIG. 6.

Figure 6:
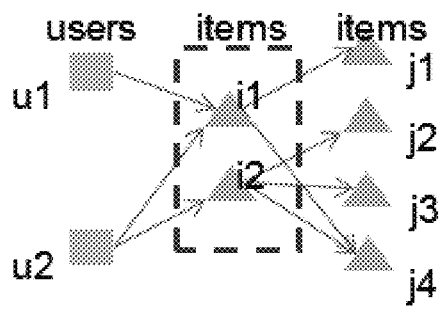
FIG. 6 is a schematic diagram of an arithmetic relation in first recommendation results in the item recommendation method according to one embodiment of the present disclosure.

In FIG. 6, "users" represents a user set, u1 and u2 are users, "items" represents an item set, i1 and i2 are access items, and j1, j2, j3 and j4 are candidate items.

The user u1 has accessed the item i1. In the item association database, the candidate items j1 and j4 are associated with the access item i1. Thus, the candidate items j1 and j4 can be recommended to the user u1. The recommendation weights of the candidate items j1 and j4 can be determined according to an association coefficient between the candidate item j1 and the access item i1 and an association coefficient between the candidate item j4 and the access item i1.

The user u2 has accessed the items i1 and i2. In the item association database, the candidate items j1 and j4 are associated with the access item i1, and the candidate items j2, j3 and j4 are associated with the access item i2. Thus, the candidate items j1, j2, j3 and j4 can be recommended to the user u2. The recommendation weight of the candidate item j1 can be determined according to an association coefficient between the candidate item j1 and the access item i1; the recommendation weight of the candidate item j2 can be determined according to an association coefficient between the candidate item j2 and the access item i2; the recommendation weight of the candidate item j3 can be determined according to an association coefficient between the candidate item j3 and the access item i2; and the recommendation weight of the candidate item j4 can be determined in combination with an association coefficient between the candidate item j4 and the access item i1 and an association coefficient between the candidate item j4 and the access item i2.

In step 503, for example, the processor 13 or the item recommendation device 200 (e.g., the recommendation module 22 in the item recommendation device 200) may obtain a second candidate recommendation item list from a cluster association database based on the one or more access items recently accessed by the user.

It should be noted that, step 502 and step 503 do not have a necessary sequential relation.

The step of obtaining the second candidate recommendation item list from the cluster association database refers to acquiring one or more candidate items and correlation indexes thereof from the candidate item database.

The cluster association database stores clusters of access items and candidate items included in the clusters, and stores a cluster-item forward index and an item-cluster reverse index. The correlation indexes of candidate items acquired from the candidate item database at the moment are membership degrees of the access items and the candidate items relative to the clusters.

In the case where the candidate item database includes a cluster association database, second recommendation weights are determined for the candidate items acquired from the cluster association database according to formula (2) below, and the recommendation weights of the candidate items are determined based on the second recommendation weights of the candidate items:

$$r'_{uj} = \sum_{i \in R(u)} \sum_{c \in C(i)} k'_{ui} sim'(c, i) sim'(c, j) \quad (2)$$

wherein, $r'_{uj}$ is a second recommendation weight of a candidate item $I_j$ relative to the user u, R(u) is a set of access items $I_i$ recently accessed by the user, C(i) is a set of clusters of the items $I_i$, $k'_{ui}$ is a coefficient, sim'(c,i) is a membership degree of the access item $I_i$ relative to a cluster c, and sim'(c, j) is a membership degree of the candidate item $I_j$ relative to the cluster c. The coefficient $k'_{ui}$ is generally 1, or different coefficients are allocated to different $I_i$. For example, the later the time when the user u accesses the $I_i$ is, the larger the coefficient $k'_{ui}$ may be. If R(u) is a set of all access items (no matter whether the user accesses the access items) herein, the coefficient $k'_{ui}$ is 0 for the access items not recently accessed by the user.

That is to say, in the step, the corresponding cluster ID is inquired with an access item, an item-cluster reverse index and a cluster-item forward index in the cluster are retrieved with the cluster ID, and a second candidate recommendation item list is generated. The schematic algorithm in this step is shown in FIG. 7.

Figure 7:
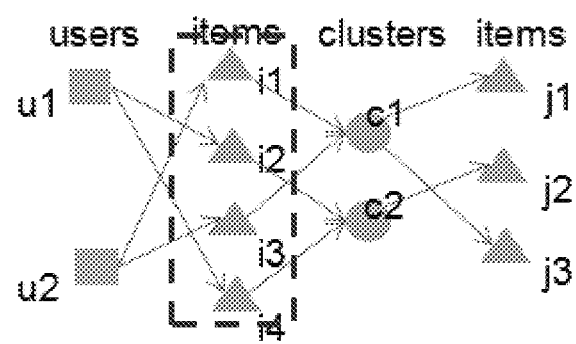
FIG. 7 is a schematic diagram of an arithmetic relation in second recommendation results in the item recommendation method according to one embodiment of the present disclosure.

In FIG. 7, "users" represents a user set, u1 and u2 are users, "items" represents an item set, "clusters" represents a cluster set, c1 and c2 are clusters, i1, i2, i3 and i4 are access items, and j1, j2 and j3 are candidate items.

The user u1 has accessed the items i2 and i4. The access items i2 and i4 belong to the cluster c2. The candidate item j2 also belongs to the cluster c2. Thus, the candidate item j2 can be recommended to the user u1. The recommendation weight of the candidate item j2 can be determined in combination with the membership degree of the candidate item j2 relative to the cluster c2 and the membership degrees of the access items i2 and i4 relative to the cluster c2.

The user u2 has accessed the items i1 and i3. The access items i1 and i3 belong to the cluster c1. The candidate items j1 and j3 also belong to the cluster c1. Thus, the candidate items j1 and j3 can be recommended to the user u2. The recommendation weights of the candidate items j1 and j3 can be separately determined in combination with the membership degrees of the candidate items j1 and j3 relative to the cluster c1 and the membership degrees of the access items i1 and i3 relative to the cluster c1.

In step 504, for example, the processor 13 or the item recommendation device 200 (e.g., the recommendation module 22 in the item recommendation device 200) may obtain a third candidate recommendation item list from a historical recommendation list of the user based on the one or more access items accessed by the user recently.

In this step, the third candidate recommendation item list is generated using the historical recommendation list retrieved and stored with the user ID, that is, a latest real-time personalized recommendation result list.

In step 505, for example, the processor 13 or the item recommendation device 200 (e.g., the recommendation module 22 in the item recommendation device 200) may fuse and rank the first candidate recommendation item list, the second candidate recommendation item list and the third candidate recommendation item list to generate a final real-time recommendation result list.

In this step, the final real-time recommendation result list can be generated by fusing the first candidate recommendation item list, the second candidate recommendation item list and the third candidate recommendation item list. The fusing method may be simple summation, or weighted summation, or other forms. That is to say, the fusing method may be direct linear superposition, or weighted linear superposition, or multiplication or other combined forms or the like, which is not limited herein.

In step 506, for example, the processor 13 or the item recommendation device 200 (e.g., the update module 23 in the item recommendation device 200) may update the stored historical recommendation list.

In this step, the stored historical recommendation list, namely user's real-time personalized recommendation result, is updated for next personalized recommendation on the one hand and to serve as a third candidate recommendation item list during next real-time recommendation on the other hand.

It should be noted that when the candidate item database for online storage only includes the item-item list or only includes the cluster-item forward index and the item-cluster reverse index, the first candidate recommendation item list or the second candidate recommendation item list can be directly obtained.

It should be further noted that only the first candidate recommendation item list and the second candidate recommendation item list may be fused and ranked to obtain final real-time recommendation results list without considering the historical recommendation list.

The technical solution of the application in the embodiment of the present disclosure will be further illustrated below.

Application Scenario:

A video recommendation scenario is taken as an example but not limited thereto. As an example, a video database may include a video A, a video B, a video C, a video D and a video E. The following relations can be obtained previously by digging the correlations among the videos offline:

Video A: video B/0.8, video C/0.6
Video B: video A/0.8
Video C: video D/0.8, video A/0.6, video E/0.5
Video D: video C/0.8
Video E: video C/0.5

The digit behind the slash represents an association coefficient between the item ahead of the slash and the correlation score of the item in the record (the association coefficient may be used as the aforementioned "correlation index"). For example, "Video A: video B/0.8, video C/0.6" indicates that the association coefficient between the video B and the video A is 0.8, and the association coefficient between the video C and the video A is 0.6.

It should be noted that the association coefficients of the video A and the video B are the same, for example, but are not limited thereto, and the association coefficient of the video A relative to the video B and the association coefficient of the video B relative to the video A may also be different. For example, if an item A and an item B are present, the association coefficient (e.g., correlation score) of the item A relative to the item B and the association coefficient of the item B relative to the item A may be the same or different.

Further, the above videos are clustered previously offline to obtain the following two clusters:

Cluster 1: video A/0.8, video B/0.6
Cluster 2: video C/0.8, video D/0.7, video E/0.6

The digit behind the slash represents a cluster membership degree (which may be used as the aforementioned "correlation index"). For example, "Cluster 1: video A/0.8, video B/0.6" indicates that the membership degree of the video A relative to the cluster 1 is 0.8, and the membership degree of the video B relative to the cluster 1 is 0.6.

For example, for the user u, it can be assumed that the recommendation result stored in the historical recommendation list is video E/0.35. The digit behind the slash represents a historical recommendation weight (e.g., a recommendation weight obtained when the recommendation list is generated previously). For example, "video E/0.35" indicates that the historical recommendation weight of the video E is 0.35.

When the user u accesses the video C, the handling process of the solution in the embodiment of the present disclosure is as follows:

In the item-item list, relevant videos of the video C are inquired to obtain a first candidate recommendation item list based on high-to-low correlation scores: video D/0.8, video A/0.6, video E/0.5.

In the item-cluster reverse index, the cluster of the video C is inquired as "cluster 2/0.8", indicating that the cluster membership degree of the video C in the cluster 2 is 0.8. Further, the videos in the cluster 2 are inquired via the cluster-item forward index to obtain a second candidate recommendation item list based on high-to-low cluster membership degrees: video D/0.7, video E/0.6.

The previous latest real-time recommendation result stored for the user u is inquired in the historical recommendation list, namely the latest real-time personalized recommendation result list, to obtain a third candidate recommendation item list: video E/0.35.

The above three candidate recommendation item lists are fused according to a set method to obtain final real-time recommendation results:

Video A: 0.6
Video D: 0.8+0.8*0.7=1.36
Video E: 0.5+0.8*0.6+0.35=1.33

Since the video A only appears in the first candidate recommendation item list, the result is Video A: 0.6, indicating that the recommendation weight of the video A is 0.6.

Since the video D is video D/0.8 in the first candidate recommendation item list and is video D/0.7 in the second candidate recommendation item list and the cluster membership degree of the video C in the cluster 2 is 0.8, the cluster membership degree 0.7 of the video D in the cluster 2 is multiplied by the cluster membership degree 0.8 of the video C in the cluster 2, and the product is added with the correlation score 0.8 of the video D in the first candidate recommendation item list to obtain that the recommendation weight of the video D is 1.36.

Since the video E is video E/0.5 in the first candidate recommendation item list, video E/0.6 in the second candidate recommendation item list and video E/0.35 in the third candidate recommendation item list and the cluster membership degree of the video C in the cluster 2 is 0.8, the cluster membership degree 0.6 of the video E in the cluster 2 is multiplied by the cluster membership degree 0.8 of the video C in the cluster 2, and the product is added with the correlation score 0.8 of the video D in the first candidate recommendation item list and the recommendation weight 0.35 in the third candidate recommendation item list to obtain that the recommendation weight of the video E is 1.33.

It should be noted that the above three candidate recommendation item lists may be fused according to a set method by direct linear superposition, or weighted linear superposition, or multiplication or other combined forms or the like.

Finally, according to the high-to-low sequence of the recommendation weights, the final recommendation result is: video D/1.36, video E/1.33, video A/0.6.

It should be noted that described above is ranking based on the recommendation weights to present recommendation items to the user, wherein the ranking based on the recommendation weights is illustrated in a high-to-low order but not limited thereto.

Next, the latest real-time recommendation result for the user u may be updated in the historical recommendation list: video D/1.36, video E/1.33, video A/0.6.

Similarly, when the user u accesses other videos later, the recommendation result is adjusted in real time according to the above process.

It can be discovered that in the solution of the embodiment of the present disclosure, the recommendation result can be adjusted in real time according to user's access behavior, the real-time interest of the user can be reflected immediately, the real-time interest and the item preference of the user are adapted, quick response is made to the requirement of the user, the recommendation timeliness is improved, the requirement of the user is met, and the user experience is improved.

Further, in the embodiment of the present disclosure, different recommendation results may be realized according to different contents included in the candidate item database. For example, in the case where the candidate item database includes an item association database, first recommendation weights may be determined for the candidate items acquired from the item association database according to a set formula; in the case where the candidate item database includes a cluster association database, second recommendation weights may be determined for the candidate items acquired from the cluster association database according to a set formula; in the case where the candidate item database includes an item association database and a cluster association database, the recommendation weights of the candidate items may be determined based on a combination of the first recommendation weights and the second recommendation weights of the same candidate items. In the embodiment of the present disclosure, historical recommendation items recommended to the user historically and historical recommendation weights thereof may also be acquired from a historical recommendation list of the user, and the historical recommendation items and the one or more candidate items are fused for recommendation.

The above has described an item recommendation method according to the present disclosure with reference to the accompanying drawings. The method according to the present disclosure may be realized as a computer program, and the computer program includes computer program code instructions for executing the steps defined in the above method of the present disclosure. Or, the method according to the present disclosure may also be realized as a computer program product, the computer program product includes a computer-readable medium, and a computer program for executing the above functions defined in the above method of the present disclosure is stored in the computer-readable medium. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. It should be appreciated by those skilled in the art that various exemplary logic blocks, modules, circuits and algorithmic steps described in combination with the disclosure herein may be realized as electronic hardware, computer software or a combination of the both.

The flow diagrams and the block diagrams in the accompanying drawings show system architectures, functions and operations which may be realized according to the systems and the methods of multiple embodiments of the present disclosure. In this regard, each block in the flow diagrams or the block diagrams may represent a part of a module, a program segment or a code, and the part of the module, the program segment or the code includes one or more executable instructions for realizing specified logical functions. It should also be noted that in some alternative implementations, the functions labeled in the blocks may also occur in sequence different from that in the drawings. For example, two continuous blocks may be executed in parallel substantially or executed in opposite sequence sometimes, which depends on the involved functions. It should also be noted that each block in the block diagrams and/or flow diagrams and a combination of the blocks in the block diagrams and/or flow diagrams may be realized by a dedicated hardware-based system for executing specified functions or operations, or realized by a combination of dedicated hardware and computer instructions.

Described above are embodiments of the present invention, and the above descriptions are exemplary but not exhaustive and are not limited to the disclosed embodiments. Many modifications and alterations made without departing from the scope and spirit of the described embodiments are obvious for those of ordinary skill in the art. The terms in the descriptions are selected to best interpret the principle of each embodiment, practical application or improvement on technologies in the market, or to make other persons of ordinary skill in the art understand the embodiments disclosed in the descriptions.

What is claimed is:

1. A video or content recommendation system, comprising one or more processors and one or more non-transitory computer-readable memories coupled to the one or more processors and configured with instructions executable by the one or more processors to cause the system to perform operations comprising:
   acquiring candidate items among users according to item access logs of the users;
   storing, in a memory, an updated personalized historical recommendation list of a user of the users, wherein the updated personalized historical recommendation list comprises historical recommendation items recommended to the user historically and updated personalized historical recommendation weights thereof;
   reading the historical recommendation items recommended to the user historically and the updated personalized historical recommendation weights thereof from the memory;
   storing, in a database, at least a portion of the candidate items to be recommended to the user;
   acquiring an access item accessed by the user;
   acquiring, from the stored candidate items, one or more recommendation items and respective correlation indexes, each of the correlation indexes comprising an association coefficient between a corresponding one of the candidate items and the access item, wherein the acquiring one or more recommendation items and respective correlation indexes comprises:
      obtaining a first candidate recommendation item list based on the correlation indexes;
      obtaining a second candidate recommendation item list based on:
         a first cluster membership degree between a cluster to which the access item belongs and the access item; and
         a second cluster membership degree between the cluster and a corresponding one of the stored candidate items, the cluster comprising:
            the access item; and
            a second item having at least a threshold similarity with the access item, the second item being stored in the database as one of the candidate items;
   generating an item recommendation list based on the first candidate recommendation item list, the second candidate recommendation item list and the historical recommendation items, the item recommendation list comprising the one or more recommendation items and respective recommendation weights thereof, each of the recommendation weights being determined based on:
      a correlation index, selected from the correlation indexes, of a corresponding recommendation item of the recommendation items;
      the first cluster membership degree;
      the second cluster membership degree between the cluster and the corresponding one of the recommendation items; and
      a set of user specific coefficients;
   updating the updated personalized historical recommendation list according to the item recommendation list; and
   retrieving a video or content based on the generated item recommendation list.

2. The video or content recommendation system of claim 1, each of the recommendation weights corresponding to a candidate item of the one or more candidate items being determined by combining:
   the correlation index;
   a product of:
      the first cluster membership degree of the access item relative to the cluster; and
      the second cluster membership degree of the candidate item relative to the cluster; and
   a historical recommendation weight of the candidate item.

3. A non-transitory computer-readable storage medium configured with instructions executable by one or more processors to cause the one or more processors to perform operations comprising:
   acquiring one or more recommendation items and respective correlation indexes from a candidate item database that stores candidate items to be recommended to a user in association with access items accessed by the user, each of the correlation indexes comprising an association coefficient between a corresponding one of the candidate items and the access item, wherein the acquiring one or more recommendation items and respective correlation indexes comprises:

obtaining a first candidate recommendation item list based on the correlation indexes;
obtaining a second candidate recommendation item list based on:
 a first cluster membership degree between a cluster to which the access item belongs and the access item; and
 a second cluster membership degree between the cluster and a corresponding one of the stored candidate items, the cluster comprising:
  the access item; and
  a second item having at least a threshold similarity with the access item, the second item being stored in the database as one of the candidate items;
generating an item recommendation list according to the candidate items and the respective correlation indexes, and based on the first candidate recommendation item list, the second candidate recommendation item list, and historical recommendation items the item recommendation list comprising the one or more recommendation items and respective recommendation weights thereof, each of the recommendation weights being determined based on:
 a correlation index, selected from the correlation indexes, of a corresponding recommendation item of the recommendation items;
 the first cluster membership degree;
 the second cluster membership degree between the cluster and the corresponding one of the recommendation items; and
 a set of user specific coefficients; and
retrieving a video or content based on the generated item recommendation list, wherein: the candidate items are acquired among users according to item access logs of the users;
the historical recommendation items are read from a memory;
the historical recommendation items are recommended to the user historically and comprised, along with updated personalized historical recommendation weights thereof, in an updated personalized historical recommendation list of the user stored in a memory; and
the updated personalized historical recommendation list is updated according to the item recommendation list.

4. The non-transitory computer-readable storage medium of claim 3, wherein,
the candidate item database comprises an item association database that stores the correlation indexes and a cluster association database that stores the first cluster membership degree and the second cluster membership degree corresponding to each of the candidate items.

5. The non-transitory computer-readable storage medium of claim 4, wherein generating the item recommendation list comprises:
determining first recommendation weights for the candidate items acquired from the item association database according to a following formula, and determining the recommendation weights of the candidate items based on the first recommendation weights of the candidate items:

$$r_{uj} = \sum_{i \in R(u)} k_{ui} sim(i, j) \qquad (1)$$

wherein, $r_{uj}$ is a first recommendation weight of a candidate item $I_j$ relative to a user u, R(u) is a set of access items $I_i$ accessed by the user, $k_{ui}$ is a first user specific coefficient from the set of user specific coefficients, and sim(i, j) is an association coefficient of the candidate item $I_j$ relative to the access item $I_i$;
determining second recommendation weights for the candidate items acquired from the cluster association database according to a following formula, and determining the recommendation weights of the candidate items based on the second recommendation weights of the candidate items:

$$r'_{uj} = \sum_{i \in R(u)} \sum_{c \in C(i)} k'_{ui} sim'(c, i) sim'(c, j) \qquad (2)$$

wherein, $r'_{uj}$ is a second recommendation weight of a candidate item $I_j$ relative to the user u, R(u) is the set of access items $I_i$ accessed by the user, C(i) is a set of clusters of the items $I_i$, $k'_{ui}$ is a second user specific coefficient from the set user specific coefficients, sim'(c,i) is the first membership degree of the access item $I_i$ relative to a cluster c, and sim'(c, j) is the second membership degree of the candidate item $I_j$ relative to the cluster c; and
determining the recommendation weights of the candidate items based on a combination of the first recommendation weights and the second recommendation weights for the same candidate items.

6. The non-transitory computer-readable storage medium of claim 5, wherein generating the item recommendation list comprises:
fusing the historical recommendation items and the candidate items, and determining the recommendation weights based on the correlation indexes and historical recommendation weights of the same candidate items among the historical recommendation items and the one or more candidate items.

7. A video or content recommendation method, comprising:
acquiring candidate items among users according to item access logs of the users;
storing, in a memory, an updated personalized historical recommendation list of a user of the users, wherein the updated personalized historical recommendation list comprises historical recommendation items recommended to the user historically and updated personalized historical recommendation weights thereof;
reading the historical recommendation items recommended to the user historically and the updated personalized historical recommendation weights thereof from the memory;
acquiring, from the candidate items, one or more recommendation items and respective correlation indexes, each of the correlation indexes comprising an association coefficient between a corresponding one of the candidate items and an access item accessed by the user, wherein the acquiring one or more recommendation items and respective correlation indexes comprises:
 obtaining a first candidate recommendation item list based on the correlation indexes;
 obtaining a second candidate recommendation item list based on:

a first cluster membership degree between a cluster to which the access item belongs and the access item; and a second cluster membership degree between the cluster and a corresponding one of the stored candidate items, the cluster comprising:
the access item; and
a second item having at least a threshold similarity with the access item, the second item being stored in the database as one of the candidate items;

generating an item recommendation list based on the first candidate recommendation item list, the second candidate recommendation item list and the historical recommendation items, the item recommendation list comprising the one or more recommendation items and respective recommendation weights thereof, each of the recommendation weights being determined based on:
a correlation index, selected from the correlation indexes, of a corresponding recommendation item of the recommendation items;
the first cluster membership degree;
the second cluster membership degree between the cluster and the corresponding one of the recommendation items; and
a set of user specific coefficients;

updating the updated personalized historical recommendation list according to the item recommendation list; and retrieving a video or content based on the generated item recommendation list.

8. The video or content recommendation method of claim 7, wherein,
the candidate item database comprises an item association database that stores the correlation indexes and a cluster association database that stores the first cluster membership degree and the second cluster membership degree corresponding to each of the candidate items.

9. The video or content recommendation method of claim 8, further comprising:
determining first recommendation weights for the candidate items acquired from the item association database according to a following formula, and determining the recommendation weights of the candidate items based on the first recommendation weights of the candidate items:

$$r_{uj} = \sum_{i \in R(u)} k_{ui} sim(i, j) \qquad (1)$$

wherein, $r_{uj}$ is a first recommendation weight of a candidate item $I_j$ relative to a user u, R(u) is a set of access items $I_i$ accessed by the user, $k_{ui}$ is a first user specific coefficient from the set of user specific coefficients, and sim(i, j) is an association coefficient of the candidate item $I_j$ relative to the access item $I_i$;

determining second recommendation weights for the candidate items acquired from the cluster association database according to a following formula, and determining the recommendation weights of the candidate items based on the second recommendation weights of the candidate items:

$$r'_{uj} = \sum_{i \in R(u)} \sum_{c \in C(i)} k'_{ui} sim'(c, i) sim'(c, j) \qquad (2)$$

wherein, $r'_{uj}$ is a second recommendation weight of a candidate item $I_j$ relative to the user u, R(u) is the set of access items $I_i$ accessed by the user, C(i) is a set of clusters of the items h, $k'_{ui}$ is a second user specific coefficient from the set user specific coefficients, sim' (c,i) is the first membership degree of the access item $I_i$ relative to a cluster c, and sim'(c, j) is the second membership degree of the candidate item $I_j$ relative to the cluster c; and determining the recommendation weights of the candidate items based on a combination of the first recommendation weights and the second recommendation weights of the same candidate items.

10. The video or content recommendation method of claim 7,
wherein the generating the item recommendation list comprises:
fusing the historical recommendation items and the candidate items, and determining the recommendation weights based on the correlation indexes and the historical recommendation weights of the same candidate items among the historical recommendation items and the one or more candidate items.

* * * * *